(12) United States Patent
Victor-Faichney et al.

(10) Patent No.: US 10,948,997 B1
(45) Date of Patent: Mar. 16, 2021

(54) ARTIFICIAL REALITY NOTIFICATION TRIGGERS

(71) Applicant: Facebook Technologies, LLC, Menlo Park, CA (US)

(72) Inventors: Anastasia Victor-Faichney, San Francisco, CA (US); Alexander Chen Runke, Los Altos, CA (US); Difei Wang, Redwood City, CA (US); Flavio Mattos de Carvalho, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/723,989

(22) Filed: Dec. 20, 2019

(51) Int. Cl.
*G06F 3/01* (2006.01)
*G02B 27/01* (2006.01)

(52) U.S. Cl.
CPC .............. *G06F 3/017* (2013.01); *G06F 3/011* (2013.01); *G06F 3/013* (2013.01); *G02B 27/017* (2013.01)

(58) Field of Classification Search
CPC .... G06F 3/0484; G06F 3/04842; G06F 3/165; G06F 3/0482; G06F 1/163; G06F 3/0346; G06F 3/011–017
See application file for complete search history.

(56) References Cited

U.S. PATENT DOCUMENTS

| 2009/0103780 | A1* | 4/2009 | Nishihara | G06F 3/017 382/103 |
| 2012/0249797 | A1* | 10/2012 | Haddick | G06F 3/016 348/158 |
| 2017/0003750 | A1* | 1/2017 | Li | G06T 17/00 |
| 2019/0213792 | A1* | 7/2019 | Jakubzak | G06F 3/017 |
| 2019/0302895 | A1* | 10/2019 | Jiang | G06K 9/00389 |
| 2020/0193649 | A1* | 6/2020 | Moon | G06F 3/017 |

* cited by examiner

*Primary Examiner* — Sanjiv D. Patel
(74) *Attorney, Agent, or Firm* — Perkins Coie LLP

(57) ABSTRACT

An artificial reality system can display notifications in various configurations including in a minimized version or a maximized version. The artificial reality system can initially display a minimized version of the notification. Upon identifying a first trigger event, such as the user's gaze resting on the minimized version of the notification or a rotation of a user's wrist, the artificial reality system can change the display of the notification from the minimized version to the maximized version. The artificial reality system can identify a second trigger event, such as the user's gaze not being directed to the maximized version of the notification or a rotation of the wrist in an opposite direction from the first wrist rotation. In response to the second trigger event, the artificial reality system can stop display of the maximized version of the notification.

17 Claims, 14 Drawing Sheets

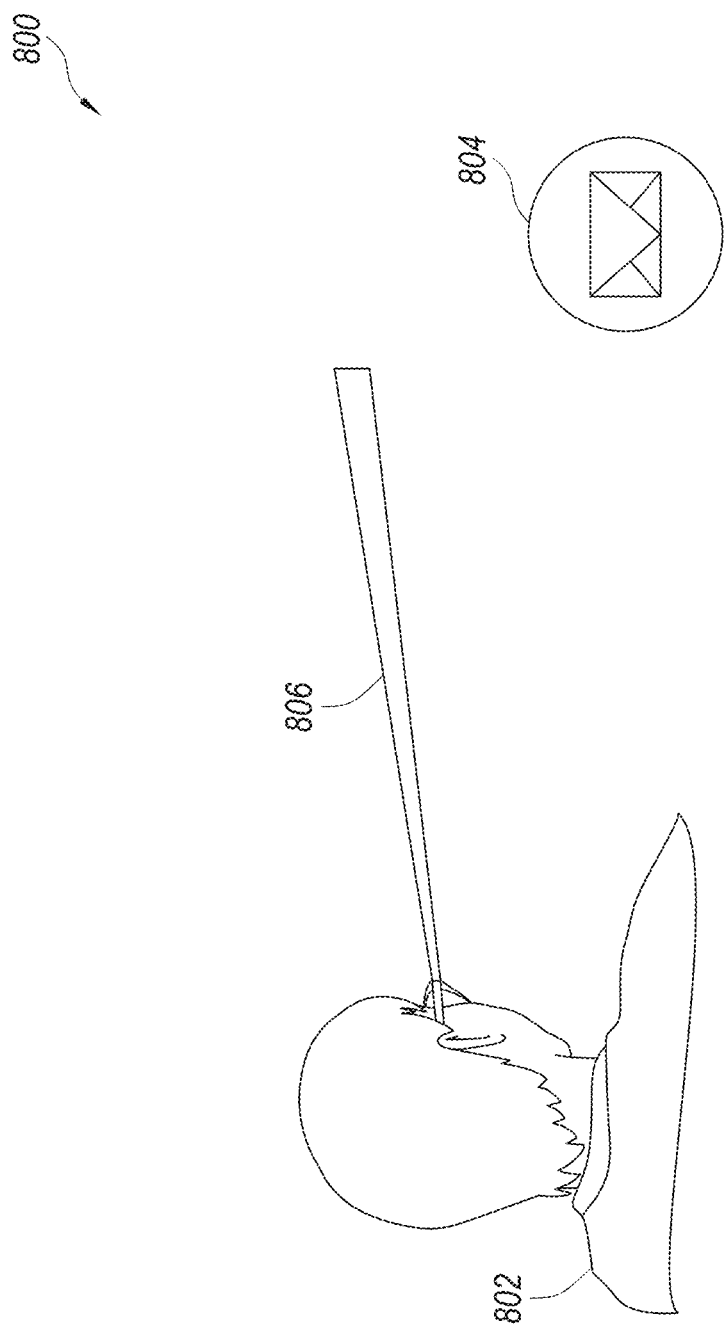

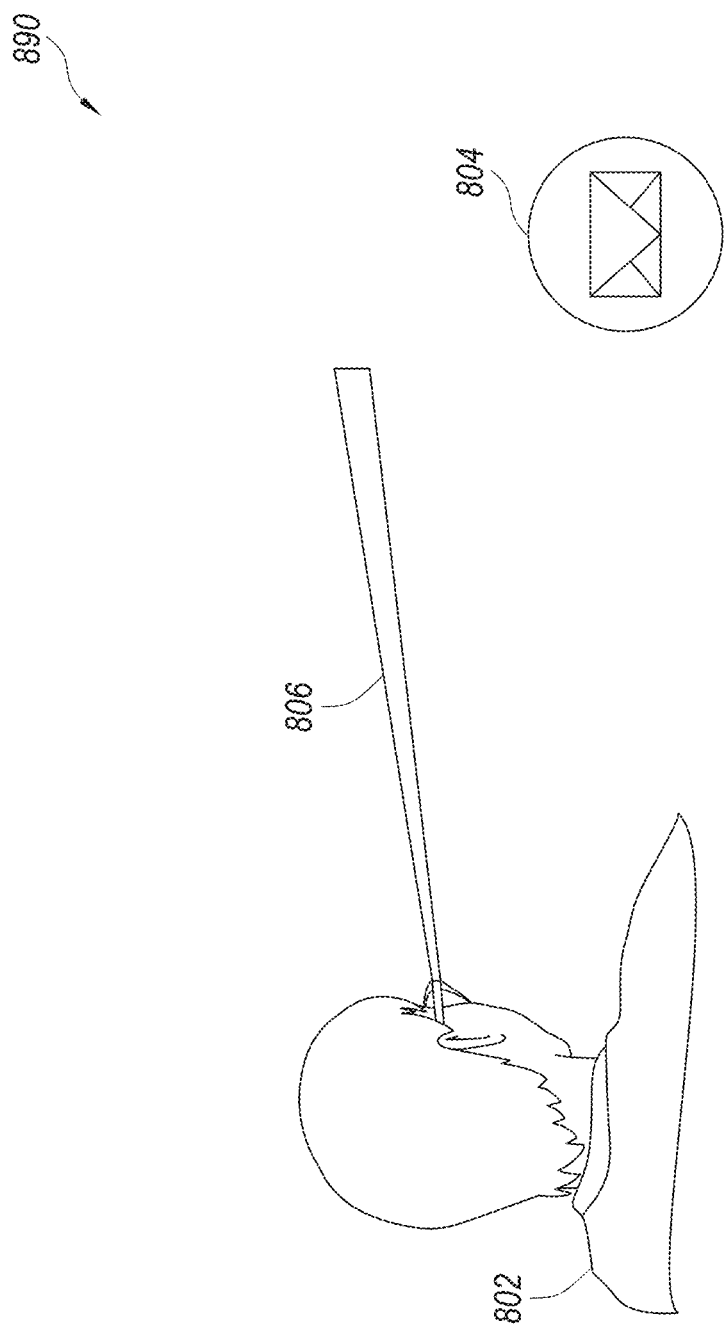

ARTIFICIAL REALITY NOTIFICATION TRIGGERS

TECHNICAL FIELD

The present disclosure is directed to interactions and notifications in an artificial reality environment.

BACKGROUND

Various objects in an artificial reality environment are "virtual objects," i.e., representations of objects generated by a computing system that appear in the environment. Virtual objects in an artificial reality environment can be presented to a user by a head-mounted display, a mobile device, a projection system, or another computing system. Some virtual objects can be notifications, such as system notifications, communication notifications, alarms, notifications from running applications, notifications from remote sources, etc. Existing artificial reality systems tend to display notifications over the middle of the display area or in a corner, regardless of the user's actions.

BRIEF DESCRIPTION OF THE DRAWINGS

FIGS. 8A-8D are conceptual diagrams illustrating an example of displaying a notification in minimized and maximized configurations according to user gaze trigger events.

The techniques introduced here may be better understood by referring to the following Detailed Description in conjunction with the accompanying drawings, in which like reference numerals indicate identical or functionally similar elements.

DETAILED DESCRIPTION

Figure 1:
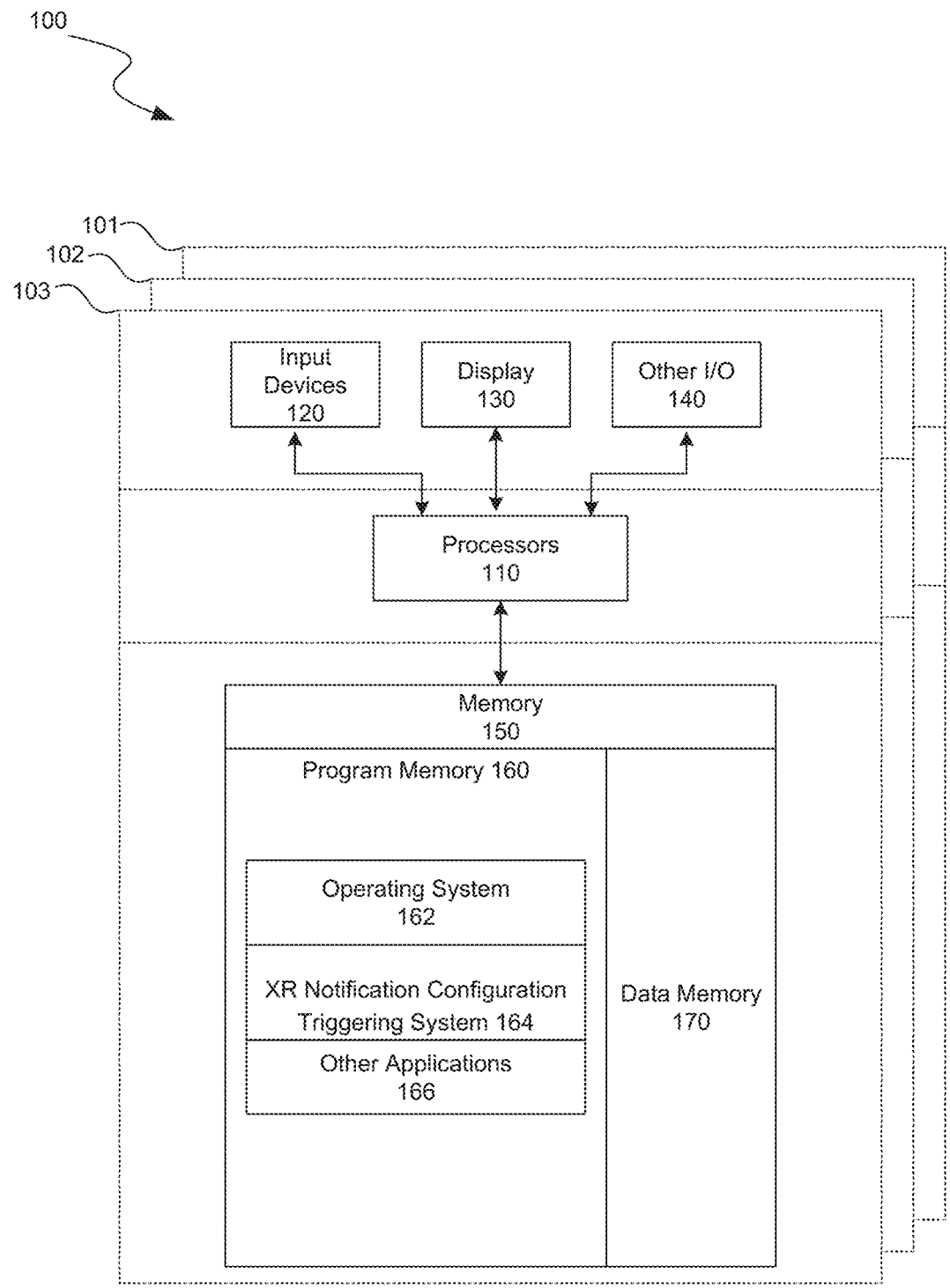
FIG. 1 is a block diagram illustrating an overview of devices on which some implementations of the present technology can operate.

Embodiments for displaying notifications configured according to trigger events in an artificial reality environment are described herein. An artificial reality system can display notifications in various configurations including in a minimized version or a maximized version. A minimized version configuration, for example, can include media and/or parameters such as an icon or other symbol, a textual summary, a specified minimized size, an inconspicuous display location, etc. A maximized version configuration, for example, can include full notification text, images, animation or video, a specified maximized size, etc. In some implementations, notification configurations can also include other output characteristics for the notifications, such as notification sounds or haptics, notification colors, fonts, patterns, sizes, or border properties, etc. In some implementations, notification configurations can also specify how a notification interacts with other real or virtual objects, such as which object the notification is attached to, whether the notification is placed in front of or behind objects in virtual space, whether the notification moves in relation to user movement, whether the notification reacts to other objects (e.g., whether the notification can be moved aside in reaction to other objects or whether the notification can move aside other objects), etc.

In some implementations, the artificial reality system can receive an indication of a notification that is associated with notification configurations for both a minimized version and maximized version of the notification. The artificial reality system can initially display a minimized version of the notification, e.g., at a designated location in the artificial reality environment, at a location relative to the user's viewpoint such as in the corner of the display area, or attached to a virtual object such as a representation of the user's wrist in the artificial reality environment. The artificial reality system can then identify a first trigger event, such as the user's gaze resting on the minimized version of the notification for a threshold amount of time or, when the minimized version of the notification is attached to the back of the user's virtual wrist, a rotation of the wrist by a threshold amount. In response to the first trigger event, the artificial reality system can change the display of the notification from the minimized version to the maximized version. In some implementations, the minimized version and/or the maximized version are displayed for a set amount of time. Alternatively, the artificial reality system can identify a second trigger event, such as the user's gaze not being directed to the maximized version of the notification for a threshold amount of time or a rotation of the wrist in an opposite direction from the first wrist rotation by a threshold amount. In response to the second trigger event, the artificial reality system can stop display of the maximized version of the notification. This can include re-displaying the minimized version or no longer displaying a version of the notification.

In some implementations, the notification configurations used for displaying a notification can be based on a mapping of notification types to notification configurations. In various implementations, this mapping can be for the notification generally, for the minimized version of the notification, or for the maximized version of the notification. In some implementations, the artificial reality system can identify a type for the notification based on a type indicator associated with the notification. In some implementations, the artificial reality system can use a second mapping of an identified notification context to notification types. Examples of combinations of notification contexts that can be mapped to types include an identification of an application or operating system that was a source of the pending notification, an identification of an organization that was the source of pending notification, an identification of a relationship between a current user and a user associated with the pending notification, an identification of a subject of the pending notification, an identification of a system resource to which the notification relates, etc. The artificial reality system can then use the first mapping to select notification configurations associated with the identified type and display the notification with the selected notification configurations.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing artificial reality systems that display notifications. However, the notifications provided by these existing artificial reality systems are often intrusive or fail to provide sufficient information about a notification. This makes existing artificial reality systems frustrating and difficult to operate. The notification configuration triggering system and processes for artificial reality environments described herein are expected to overcome these problems of existing artificial reality systems and are expected to provide users with greater control over notification interactions, offer more functionality, and decrease likelihood of notifications being an unwelcome intrusion upon the user's artificial reality experience. The notification configuration triggering system and processes described herein are rooted in computerized artificial reality and user tracking systems, instead of being an analog of traditional intra-personal interactions. For example, existing interaction techniques fail to provide a method specific to artificial reality (e.g., based on body tracking) for setting and changing notification configurations.

Several implementations are discussed below in more detail in reference to the figures. FIG. 1 is a block diagram illustrating an overview of devices on which some implementations of the disclosed technology can operate. The devices can comprise hardware components of a computing system 100 that configures notifications based on user activated triggers, such as gaze tracking or monitored wrist movements. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, artificial reality (XR) notification configuration triggering system 164, and other application programs 166. Memory 150 can also include data memory 170 that can include, for example, notification content, trigger definitions, notification configurations, mappings of notification context to notification types, mappings of notification types to notification configurations, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
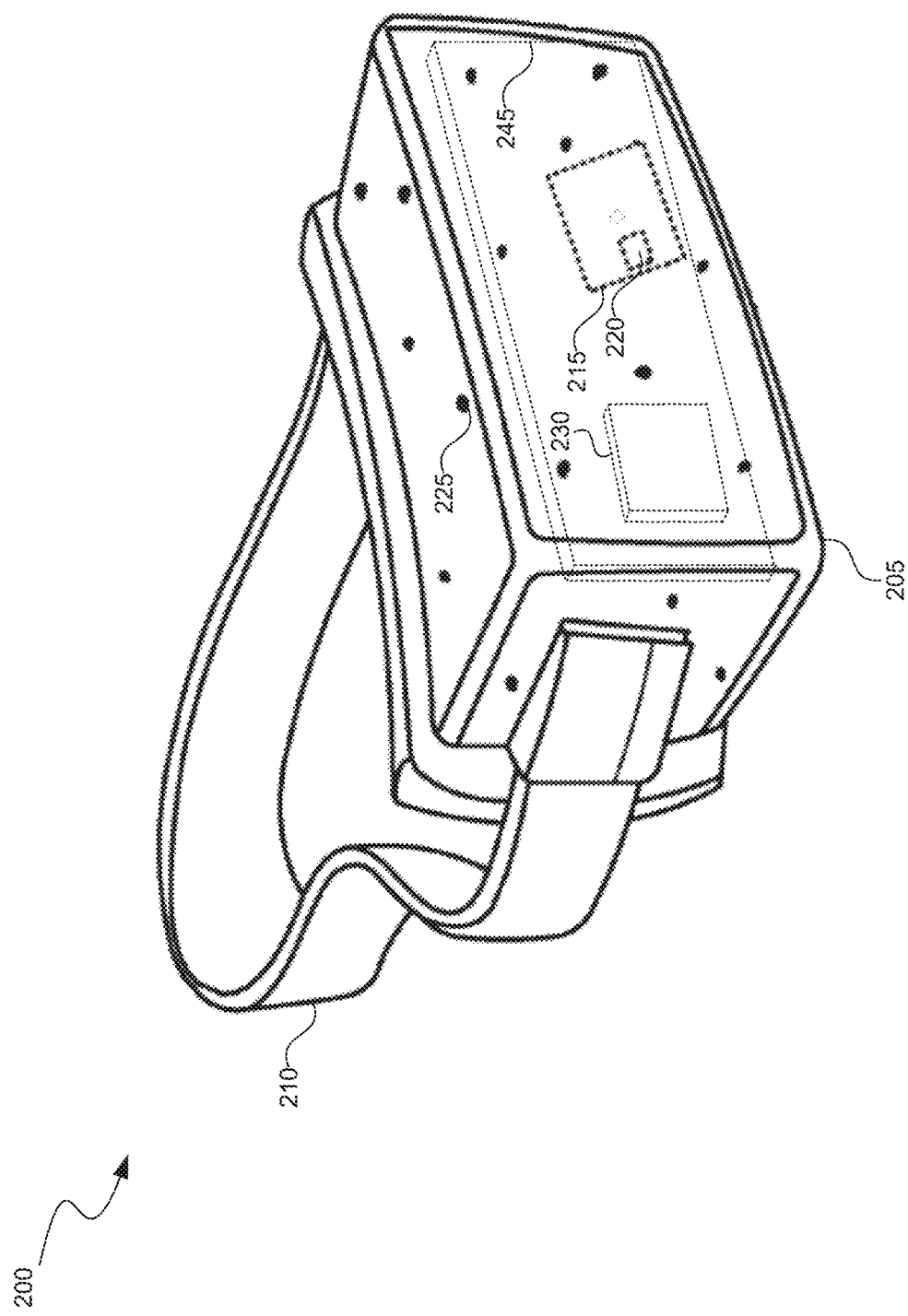
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
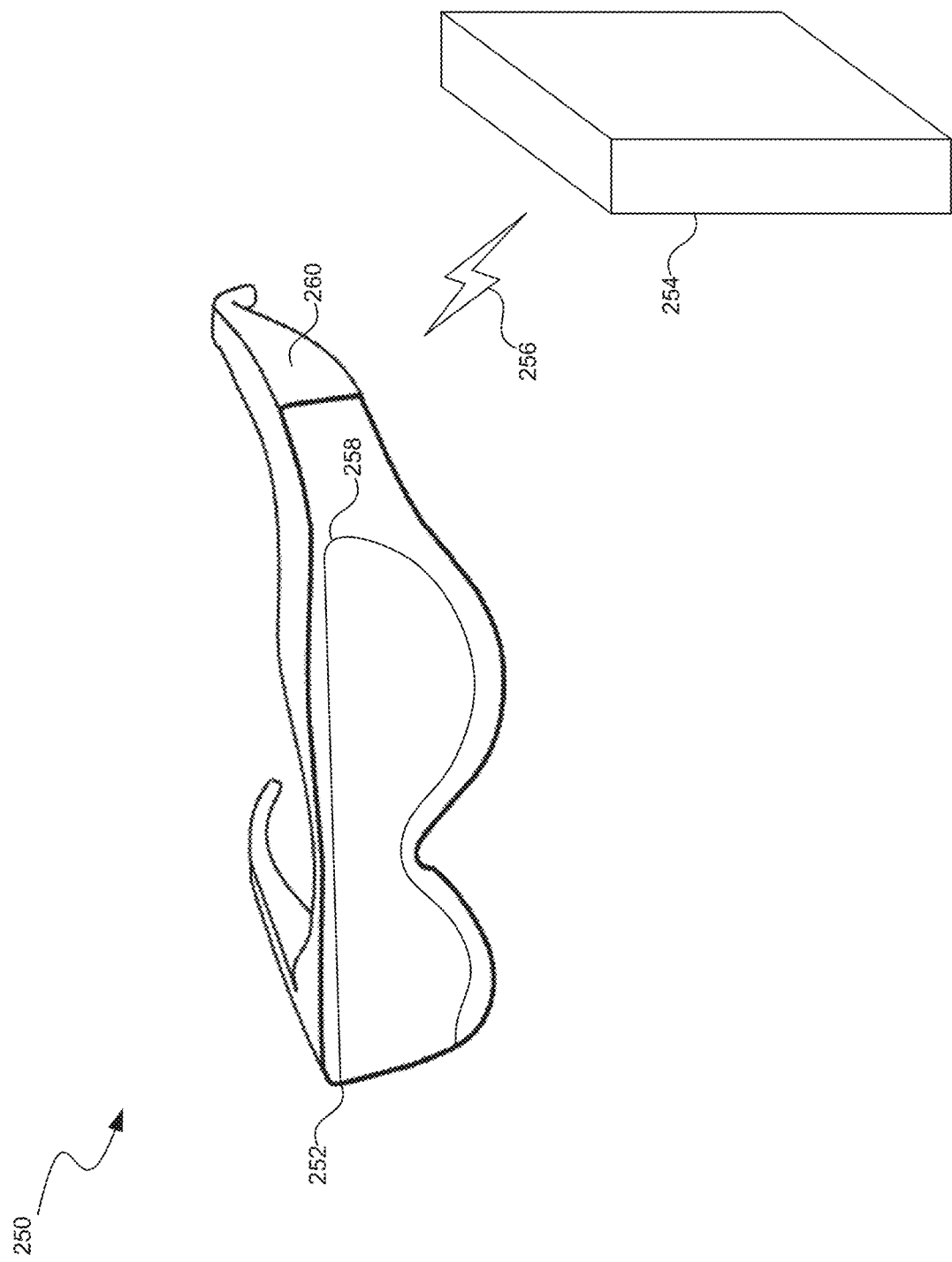
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
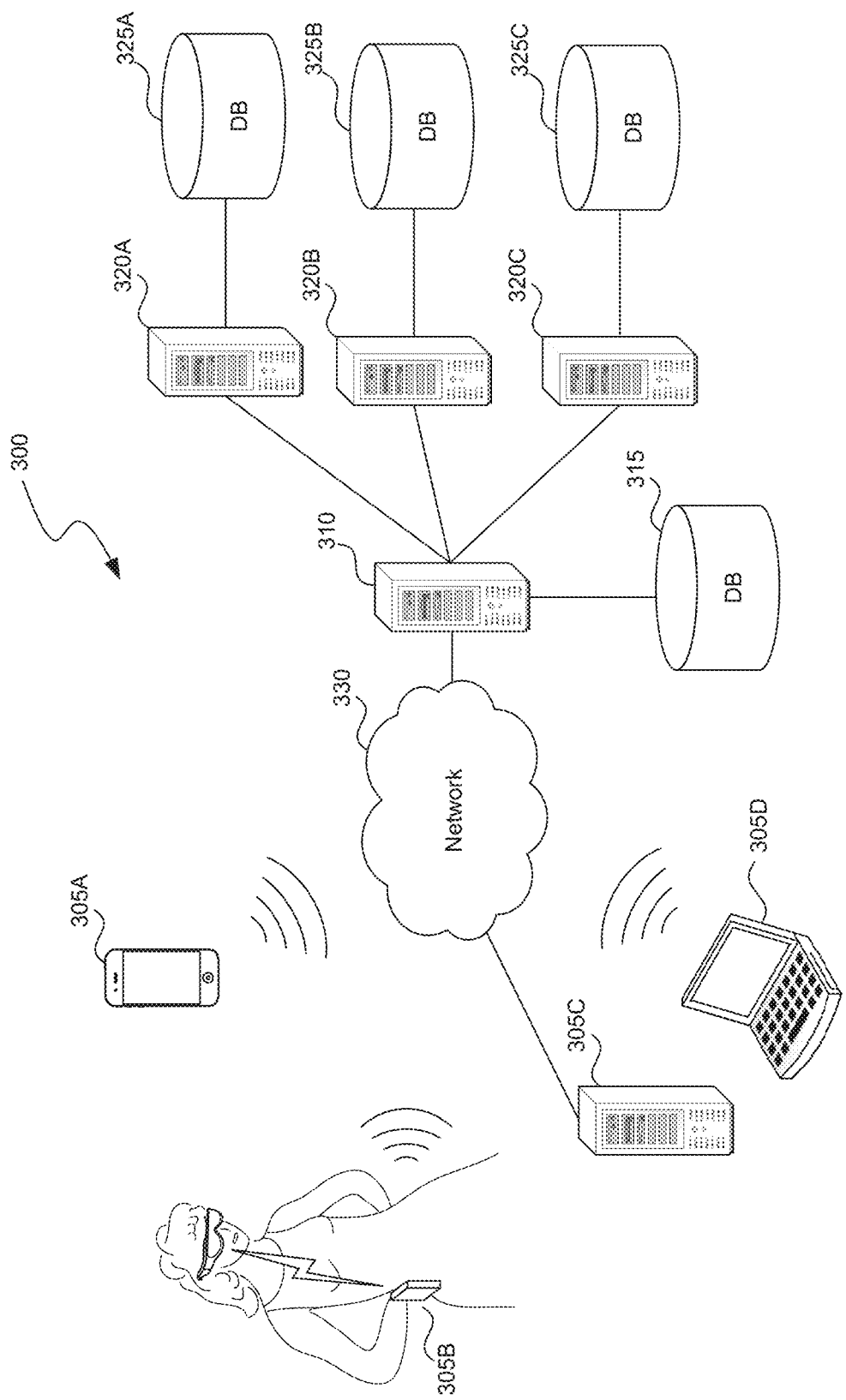
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. "Media" or "content items" can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click or an object in an artificial reality environment can correspond to social network system object. In each of these instances, the interaction between the user and the object can be represented by an edge in the social graph connecting the node of the user to the node of the object. Such interactions can also trigger notifications for an associated other user or other users associated with the target object.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in a virtual environment, etc. In some embodiments, a user can invite another user to play or watch a game, post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, send an email through the social networking system, send an email external to but originating from the social networking system, send an instant message within the social networking system, send an instant message external to but originating from the social networking system, send voice or video messaging, or interact in a virtual environment were users can communicate and interact via avatars or other digital representations of themselves. In various implementations, an artificial reality system can receive notifications of these communication events and provide versions of them to a user in the artificial reality environment.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Actions by a user can initiate a notification to the friends of that user. Establishing connections, accessing user information, communicating, and interacting within the context of the social networking system can be represented by an edge between the nodes representing two social networking system users.

Figure 4:
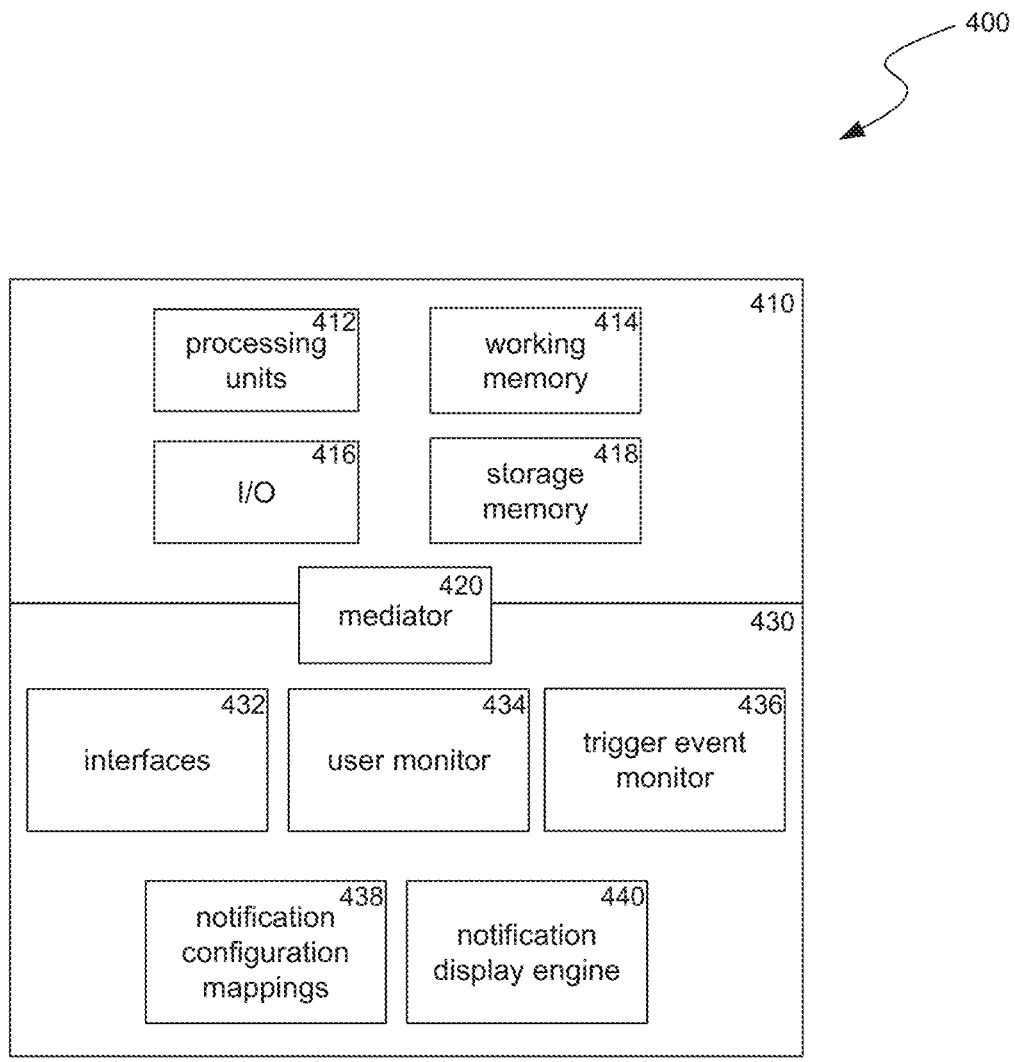
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for displaying notifications in response to triggers associated with notification configurations. Specialized components 430 can include user monitor 434, trigger event monitor 436, notification configuration mappings 438, notification display engine 440, and components and APIs which can be used for providing user interfaces, transferring data, accessing hardware, and controlling the specialized components, such as interfaces 432. In some implementations, components 400 can be in a computing system that is distributed across multiple computing devices or can be an interface to a server-based application executing one or more of specialized components 430.

User monitor 434 can track various body parts of the user such as a wrist location and rotation, an eye position and extrapolated gaze direction, hand or finger positions and directions, head positions and orientations, etc. In some implementations, user monitor 434 can accomplish this by receiving camera and/or sensor data. For example, the user monitor 434 can receive images from one or more cameras mounted on an artificial realty system headset, artificial realty system controllers, external sensors, etc. and can identify body positions depicted in the images, e.g., using machine learning models. In some cases, body position information can also, or instead, be identified based on inertial motion and/or position sensor data. In some implementations, the body position data can be determined by applying camera and/or sensor data to a kinematic model of the user's body, a model of the user's eye, etc.

Trigger event monitor 436 can receive data from user monitor 434 on positions and orientations of user body parts and/or from interfaces 432 providing indications of pending notifications and notification version positions in the artificial reality. Trigger event monitor 436 can use this data to determine if the body positions and notification locations map to a trigger event for a notification. In various implementations, trigger event monitor 436 can identify a trigger event when a minimized version of a notification is attached to a user body part (such as a wrist, forearm, or back of hand) and the body part or an inferred user condition (e.g., the user's gaze) performs a particular action. More specifically, in one case, the trigger event monitor 436 can identify a first trigger event when a user's wrist, with a minimized version of a notification attached to it, rotates a specified amount or rotates until a specified part of the wrist (e.g., opposite from the minimized notification) is pointing at the user's face. Further, the trigger event monitor 436 can identify a second trigger event when the wrist is rotated a specified amount in an opposite direction or such that the part of the wrist is no longer pointing toward the user's face. In another case, the trigger event monitor 436 can identify a first trigger events when a user's gaze is directed at a minimized version of a notification for at least a first threshold amount of time and the trigger event monitor 436 can identify a second trigger events when the user's gaze is not on a maximized version of a notification for a second threshold amount of time.

Notification configuration mappings 438 can be mappings of notification contexts to how the notification is displayed. For example, when trigger event monitor 436 has not identified a trigger action for a notification, that context can be mapped to display features showing a minimized version of the notification, such as only having an icon, having a maximum size, being at least partially transparent, etc. As another example, when trigger event monitor 436 has identified a trigger action for a notification, that context can be mapped to showing a larger notification, displaying text from the notification, etc. As a further example, when trigger event monitor 436 has identified a second trigger action for a notification, that context can be mapped to hiding a notification or returning to the minimized version of the notification. Additional examples of notification contexts that can be mapped to notification display properties include an application or operating system that was a source of the pending notification, an organization that was the source of the pending notification, a relationship between a current user and a user associated with the pending notification, a subject of the pending notification, and/or a system resource to which the notification relates. Additional examples of display properties that notification contexts can be mapped to include one or more colors, one or more fonts, one or more border properties, how a notification interacts with other real or virtual objects, and/or one or more patterns.

Notification display engine 440 can receive notifications via interfaces 432 and can display them when triggered by trigger event monitor 436, in a format based on the notification configuration mappings 438 for a current context of the notification.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
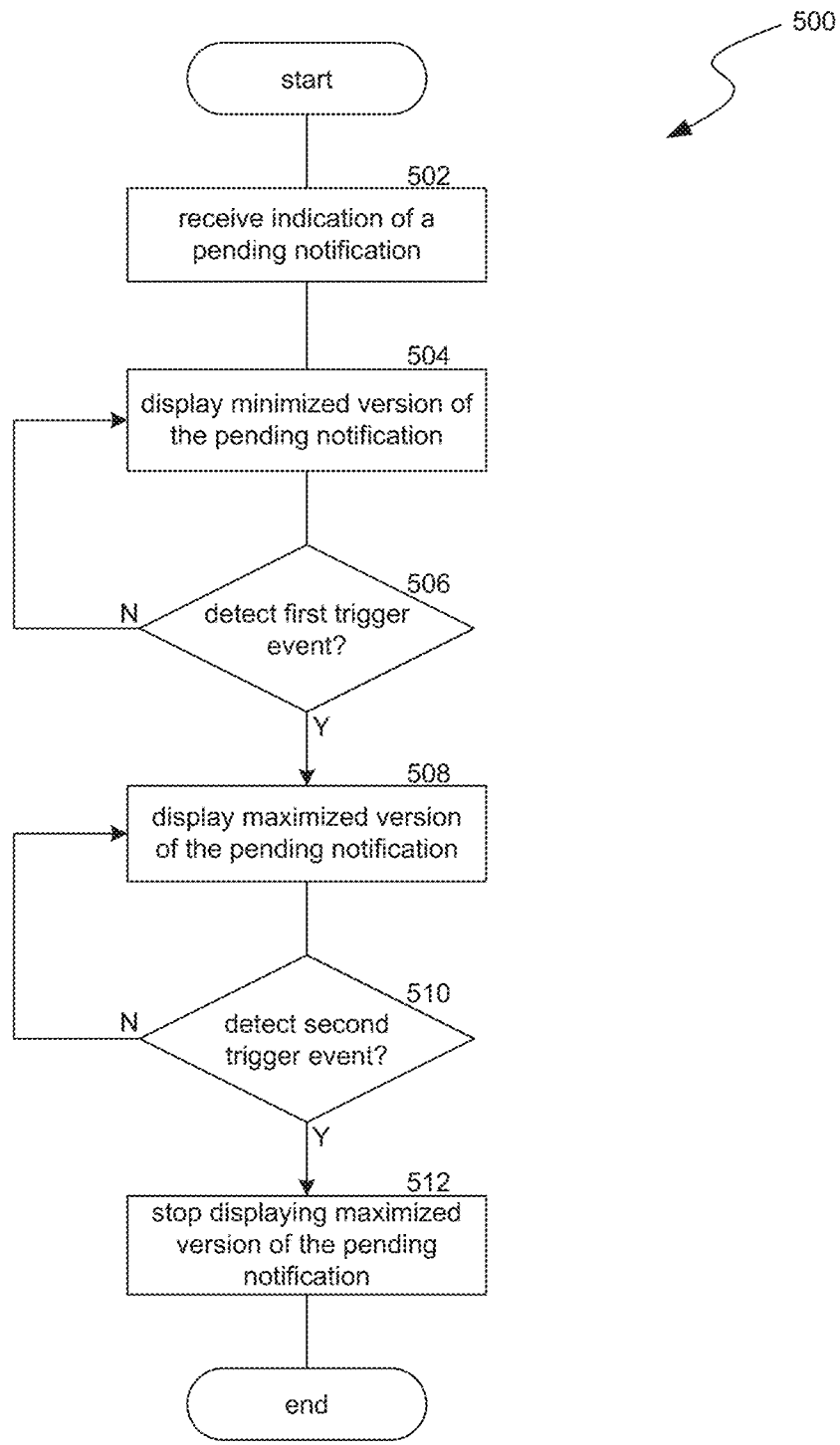
FIG. 5 is a flow diagram illustrating a process used in some implementations of the present technology for displaying notifications, in an artificial reality environment, configured according to trigger events.

FIG. 5 is a flow diagram illustrating a process 500 used in some implementations of the present technology for displaying notifications, in an artificial reality environment, configured according to trigger events. In some implementations, process 500 can be executed by an artificial reality system (e.g., any of the systems described above) in response to a new notification, e.g., a notification generated by an operating system of the artificial reality system, an application running on the artificial reality system, or by a remote system.

At block 502, process 500 can receive an indication of a pending notification. Examples of notifications include system notifications such as network connectivity notifications, resource control notifications (e.g., battery power, memory usage, processing usage, network usage, etc.), alarms, body tracking notifications, etc. Additional examples of notifications include application notifications, which can be any notification provided by an application in response to an event such as identifying particular input from a sensor, identifying a particular configuration of objects in a virtual environment, identifying a particular time, receiving data from another application, operating system, or remote source, etc. Yet further examples of notifications include notifications from a remote source (which can be supplied into the artificial reality environment via the operating system or an application), such as available update notifications, messaging notifications, or any other notification based on data received from a remote source.

At block 504, process 500 can display, in the artificial reality environment, a minimized version of the pending notification received at block 502. In various implementations, the minimized version of the pending notification can be displayed at a particular location in the artificial reality environment, such as in the center of the user's view, in a corner of the user's view, or attached to a control or menu displayed in the artificial reality environment. In some implementations, the minimized version of the notification can be attached to a particular object in the artificial reality environment, such as being positioned relative to an identified portion of a virtual representation of the user's wrist (e.g., the back of the user's virtual wrist), another body part such as a forearm, fingertip, relative to the user's face, or an external object such as an identified wall, table top, etc. In some implementations, the minimized version of the notification can be initially positioned at a particular point in the artificial reality environment (e.g., half way up on the left side of the user's display), but can be world-locked to that display position in the artificial reality environment. In some implementations, as the user moves around in the artificial reality environment, the minimized version of the notification can move, at a set velocity, toward a designated head-locked position, providing a "trailing" effect to the position of the minimized version of the notification. In some implementations, the minimized version of the notification can be initially world-locked to a particular point in the artificial reality environment relative to the user. However, if the user moves or directs her gaze more than a threshold amount from that position, the artificial reality system can move the minimized version of the notification to reorient to the particular point relative to the new position of the user, providing a "snapping" effect to the position of the minimized version of the notification.

In some implementations, the minimized version of the notification can include an image, icon, or symbol, without any text or with only a limited number of characters. In some cases, the minimized version of the notification can be shown as partially transparent, in muted or grayed colors, with small or narrow font, etc. In some implementations, the minimized version of the notification can have a particular limited size. In some cases, the minimized version of the notification can include a summary or a preview of part of a maximized version of the notification, e.g., a set number of the first characters from the maximized version of the notification, a part of an image from the maximized version of the notification, or a reduced size version of the maximized version of the notification. In some implementations, displaying the minimized version of the notification can include playing an associated sound or performing an associated haptic event (e.g., a vibration). Examples of displaying a minimized version of a notification are discussed below in relation to FIGS. 7A and 8A.

At block 506, process 500 can detect a first trigger event for maximizing a minimized notification. In some implementations, the first trigger event can be based on a tracked portion of at least part of a user. In some cases, this can be a tracked arm or wrist position. For example, where the minimized version of the notification is attached to the back or front of a user's virtual wrist, the first trigger event can be detecting a rotation of the wrist by a threshold amount or a wrist rotation such that the other side of the wrist is pointing toward the user's face. In some implementations, the tracked portion of the user can be an eye position resulting in determining a user gaze direction. In this instance, the first trigger event can be determining that the user's gaze is directed at the minimized version of the notification for a threshold amount of time. In some implementations, instead of a gaze direction, a trigger event can be based on another indicated direction from the user, e.g., pointing with another body part such as a hand or finger or pointing with a hardware controller. Examples of detecting a first trigger event are discussed below in relation to FIGS. 7B and 8B.

At block 508, in response to detecting the first trigger event at block 506, process 500 can display a maximized version of the notification. Displaying the maximized version of the notification can include showing the full text from the notification, or a larger threshold amount of the beginning text from the notification than was shown in the minimized version of the notification. In some implementations, the maximized version of the notification can include a change in color, opacity, font, border style, etc., as compared to the minimized version of the notification. In some cases, the maximized version of the notification can include an image, icon, or symbol from the minimized version of the notification. In some implementations, the maximized version of the notification can have a particular expanded size as compared to the minimized version. In some cases, the maximized version of the notification can include an animation, video, 3D model, or other media or content item. Examples of displaying a maximized version of a notification are discussed below in relation to FIGS. 7B and 8C.

At block 510, process 500 can detect a second trigger event. In some implementations, instead of performing blocks 510 and 512, process 500 can end after block 508. When block 510 is performed, similarly to block 506, the second trigger event can be based on a tracked portion of a user. In some cases, this can be a tracked arm or wrist position. For example, where the minimized version of the notification was attached to the back or front of a user's virtual wrist, the second trigger event can be detecting a rotation of the wrist by a threshold amount in a direction opposite to the direction from the first trigger event detected at block 506. As another example, the second trigger event can be a wrist rotation such that a side of the wrist with the maximized version of the notification is no longer pointing toward the user's face. In some implementations, the tracked portion of the user can be an eye position resulting in determining a user gaze direction. In this instance, the second trigger event can be determining that the user's gaze has not been directed at the maximized version of the notification for a threshold amount of time. In some implementations, instead of a gaze direction, a trigger event can be based on another indicated direction from the user, e.g., pointing with another body part such as a hand or finger or pointing with a hardware controller. Examples of detecting a second trigger event are discussed below in relation to FIGS. 7C and 8D.

At block 512, process 500 can, in response to the detected second trigger event at block 510, stop displaying the maximized version of the pending notification. For example, this can include hiding the maximized version of the pending notification or removing a data object for the maximized version of the pending notification from the artificial reality environment. In some implementations, the minimized version of the pending notification can be re-displayed. In other implementations, all indications of the notification can be hidden or removed. In some cases, an alternate control can be shown when the maximized version of the pending notification is no longer shown, such as a menu for accessing past notifications or accessing system information. In some implementations, a minimized or maximized version of a next pending notification can be displayed in response to the second trigger event. Examples of responding to a second trigger event are discussed below in relation to FIGS. 7C and 8D. After block 512, process 500 can end, e.g., until another indication of a notification is received.

Figure 6:
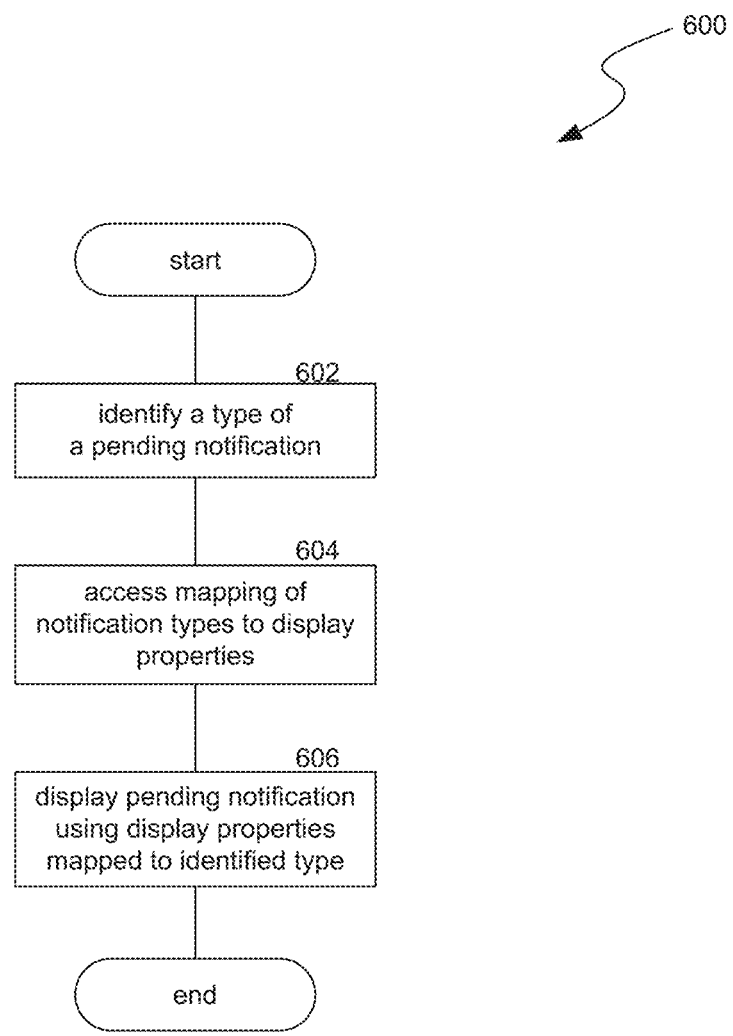
FIG. 6 is a flow diagram illustrating a process used in some implementations of the present technology for selecting a notification configuration according to a notification type.

FIG. 6 is a flow diagram illustrating a process 600 used in some implementations of the present technology for selecting a notification configuration according to a notification type. In some implementations, process 600 can be performed as a subprocess of process 500, e.g., at block 504, block 508, and/or 512.

At block 602, process 600 can identify a type of a pending notification. In some implementations, identifying a notification type can include identifying a type indicator associated with the pending notification, e.g., set in the notification by the application or operating system that created the notification. In some implementations, identifying the notification type is performed by using a mapping of an identified notification context to notification types. For example, notification contexts can include one or more of: an application or operating system that was a source of the pending notification; an organization that was the source of pending notification; a subject of the pending notification (e.g., automatically determined using natural language processing and/or machine learning models); a system resource to which the notification relates; and/or a relationship between a current user and a user associated with the pending notification. Examples of such relationships include friends or friends-of-friends in a social network, a relationship through a current game or other application the user is running, a family relationship, a co-worker or employer relationship, a common school or other organization, a common geographical area, previous communication history, or other connections identified through connections on a social graph.

At block 604, process 600 can access a mapping of notification types to display properties. Parts of this mapping can be set by the artificial reality system, by an individual application running on the artificial reality system, by the user, by a system administrator, by other users, etc. Examples of the display properties that notification types can be mapped to include one or more colors, one or more fonts, one or more patterns, one or more border or margin properties, one or more images, icons, or videos to include in notification, one or more sounds to play with the notification, one or more haptic responses to perform with the notification, how the notification reacts to other virtual objects (e.g., overlapping them, moving them, causing them to become at least partially transparent, etc.), or any other output (visual, auditory, haptic) that can be applied to a notification. At block 606, process 600 can display the notification with the notification properties mapped to the notification type in the mapping accessed at block 604. Process 600 can then end.

Figure 7A:
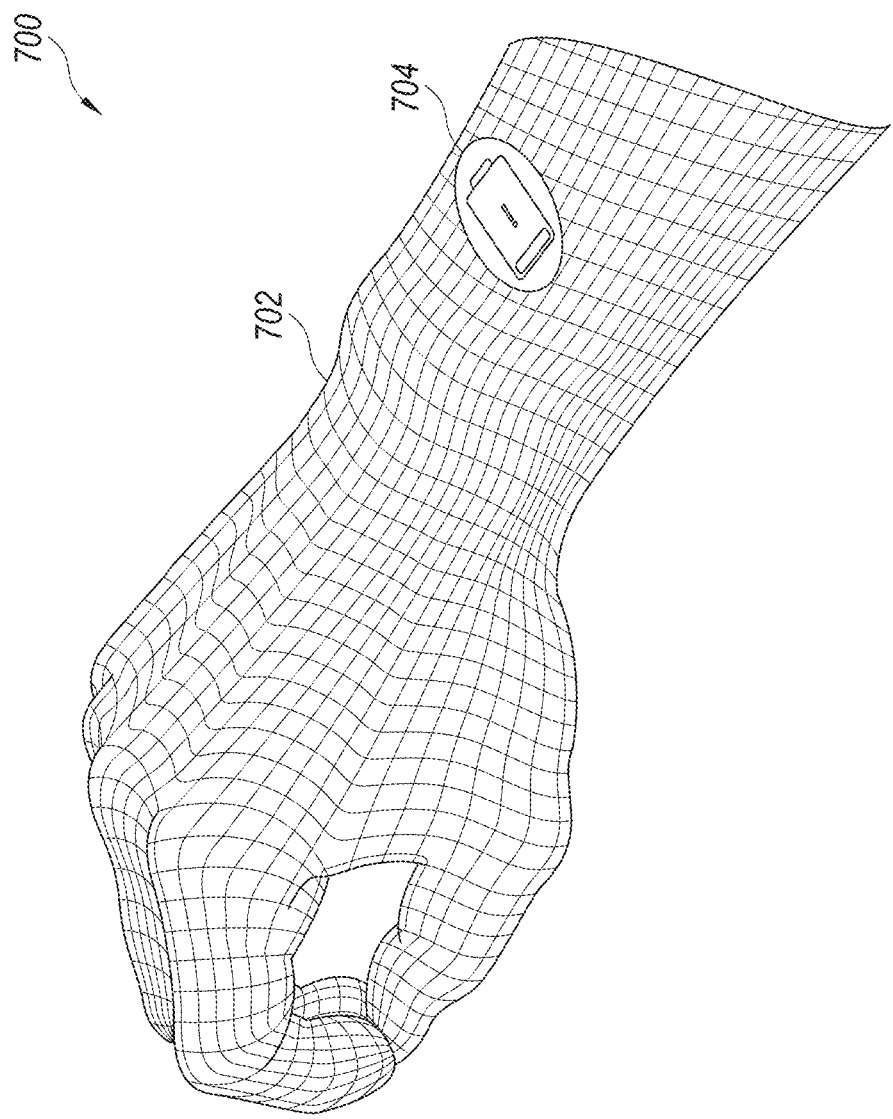
FIGS. 7A-7C are conceptual diagrams illustrating an example of displaying a notification in minimized and maximized configurations according to wrist rotation trigger events.
Figure 7B:
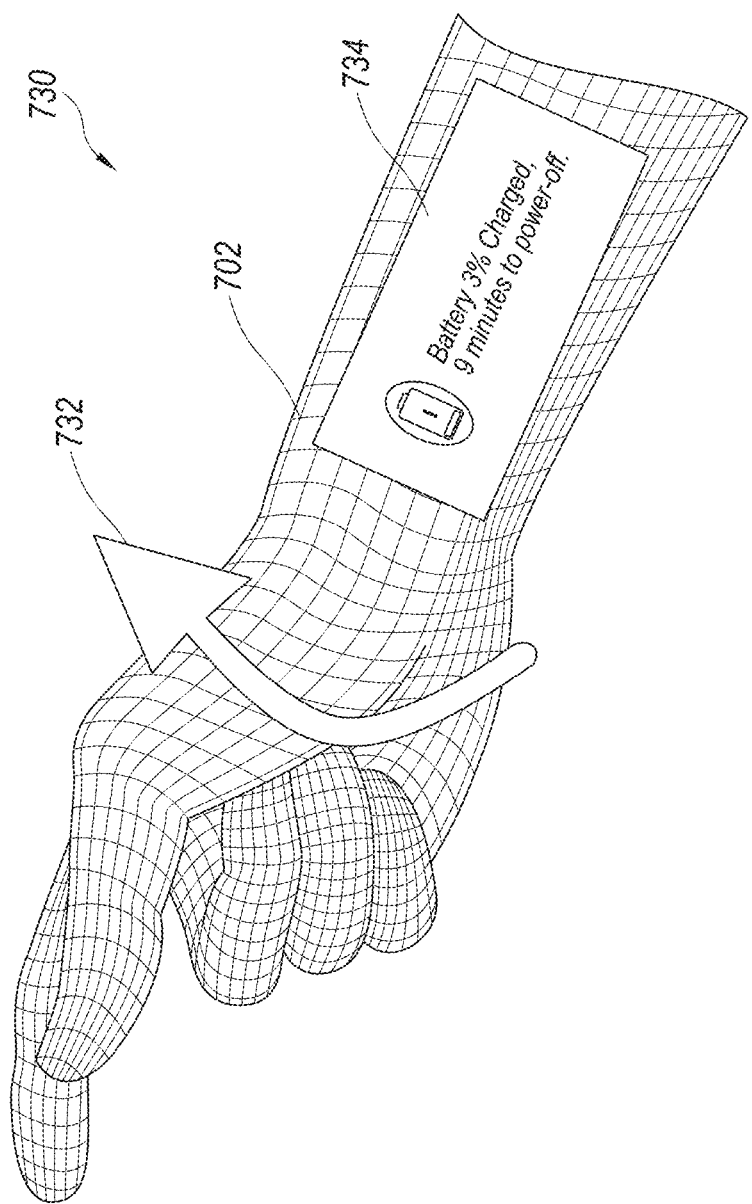
Figure 7C:
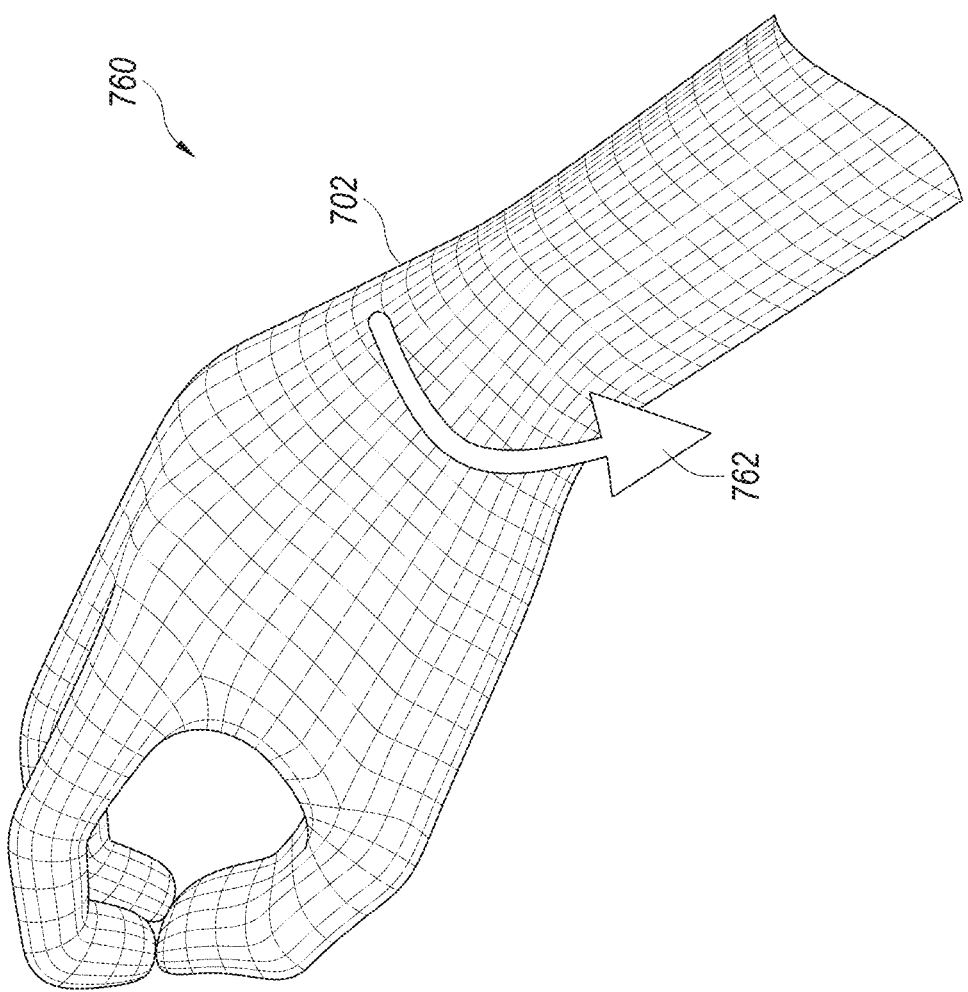
Figure 8B:
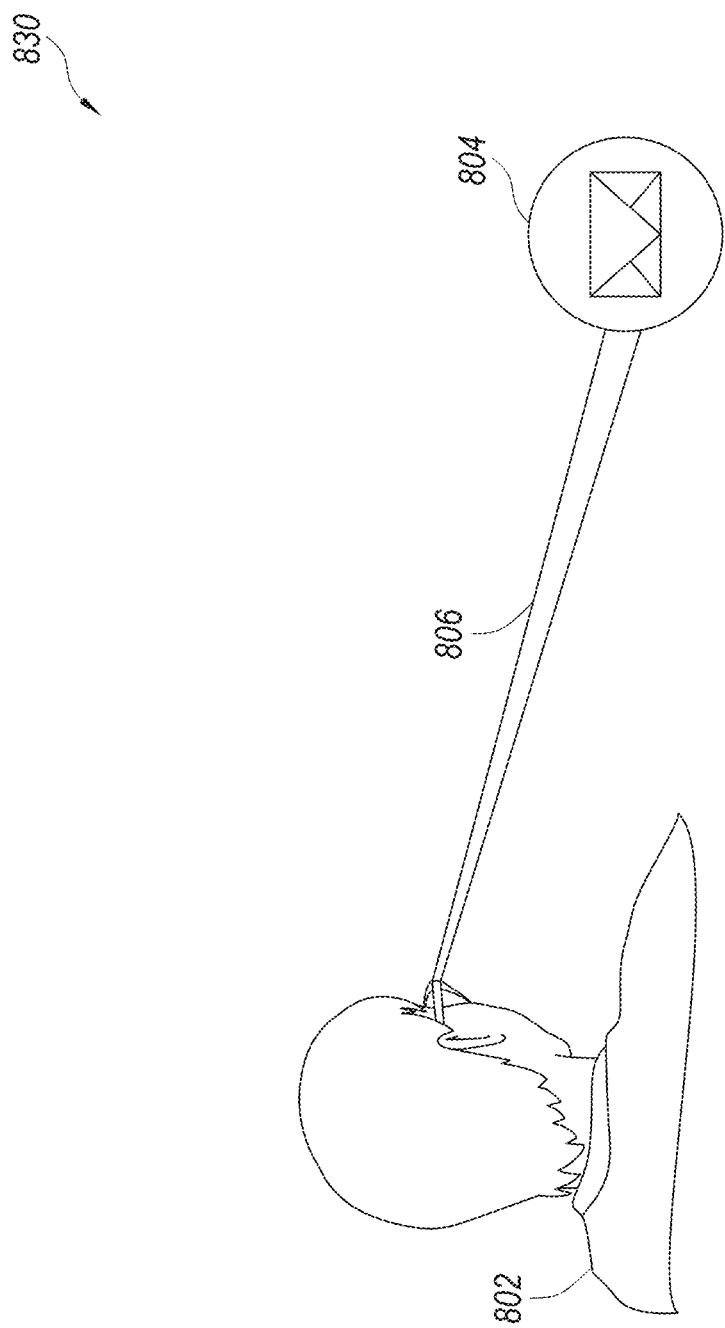
Figure 8C:
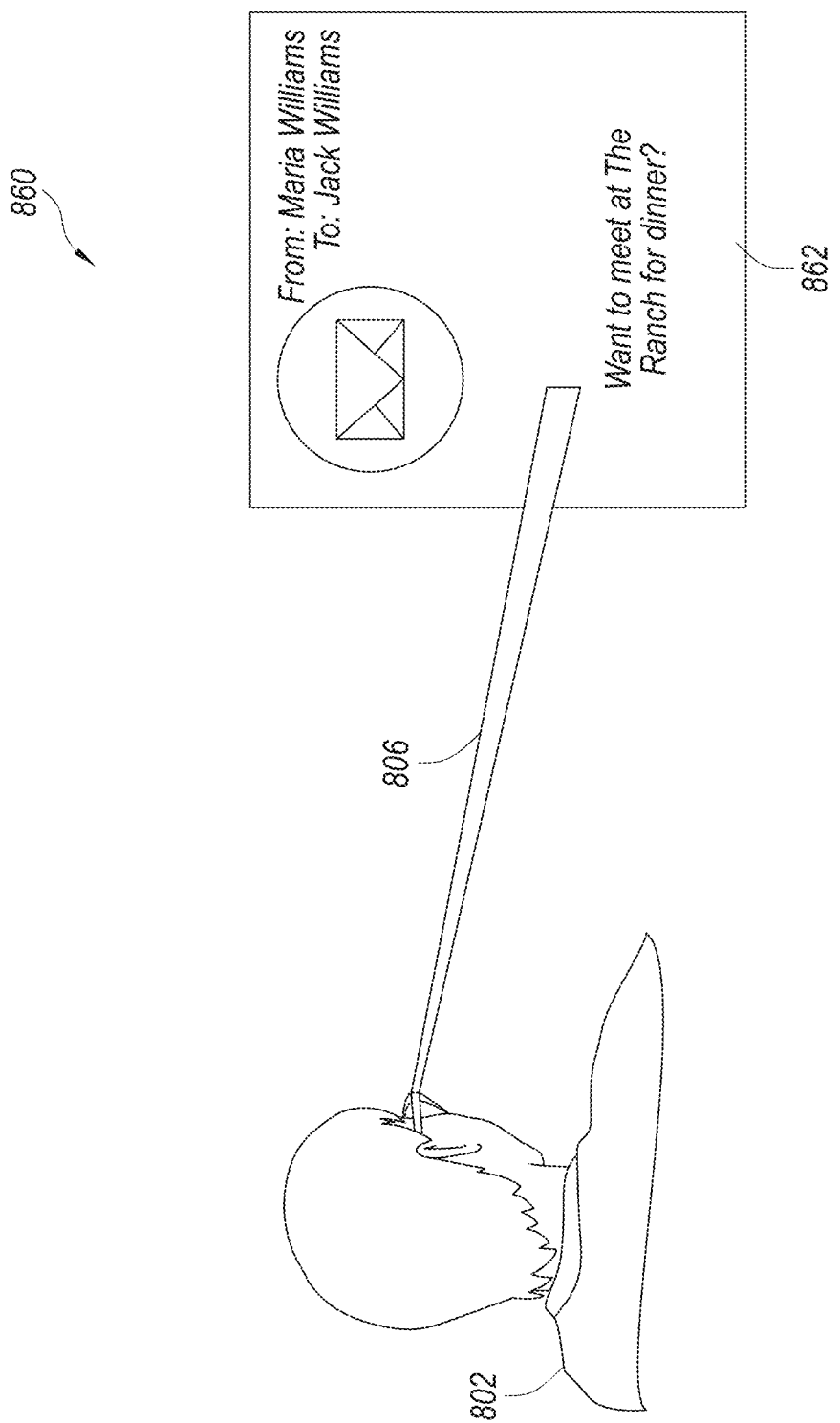

FIGS. 7A-7C are conceptual diagrams illustrating an example of displaying a notification in minimized and maximized configurations according to wrist rotation trigger events. Referring to FIGS. 7A-7C together, the example begins at 700, where a minimized version of a pending notification 704 is attached to a virtual representation of a user's hand and wrist 702. At 730, the artificial reality system identifies a rotation of the wrist 702, as illustrated by arrow 732. The wrist rotation 732 rotates the wrist 702 until the side opposite the minimized version of the pending notification 704 is directed toward the user's face. The artificial reality system identifies this as a trigger event, causing the minimized version of the pending notification 704 to be removed and a maximized version of the pending notification 734 to be shown relative to the part of the wrist directed toward the user's face. The maximized version of the pending notification 734, in this example, includes an icon from the minimized version of the pending notification 704 and a text from the pending notification. At 760, the artificial reality system identifies a second rotation of the wrist 702, as illustrated by arrow 762. The wrist rotation 762 rotates the wrist 702 a threshold amount in a direction opposite from the rotation 732. The artificial reality system identifies this second rotation 762 as a second trigger event, causing the maximized version of the pending notification 704 to be removed from the artificial reality environment.

FIGS. 8A-8D are conceptual diagrams illustrating an example of displaying a notification in minimized and maximized configurations according to user gaze trigger events. Referring to FIGS. 8A-8D together, the example beings at 800 where a minimized version of a pending notification 804 is displayed for a user 802 in a corner of the user's current view. The artificial reality system is tracking a gaze direction 806 of the user 802. At 830, the artificial reality system identifies that the tracked gaze 806 is directed at the minimized version of the pending notification 804. When the gaze 806 has been directed at the minimized version of the pending notification 804 for a threshold amount of time (e.g., 1, 2, or 3 seconds), the artificial reality system identifies this as a trigger event. At 860, in response to the trigger event, the artificial reality system causes the minimized version of the pending notification 804 to be replaced with a maximized version of the pending notification 862. The maximized version of the pending notification 864, in this example, includes an icon from the minimized version of the pending notification 804 and a text from the pending notification. The artificial reality system continues to track the gaze direction 806 as it lingers on the maximized version of the pending notification 864. When the tracked gaze 806 leaves the maximized version of the pending notification 864 for a second threshold amount of time (e.g., 1, 2, or 3 seconds), at 890, the artificial reality system identifies this as a second trigger event, causing the maximized version of the pending notification 804 to be replaced with the original minimized version of the pending notification 804.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing notifications in an artificial reality environment, the method comprising:
   receiving an indication of a pending notification;
   displaying a minimized version of the pending notification in the artificial reality environment;
   detecting a first trigger event comprising one or more of:
      identifying a user gesture comprising a first rotation of a wrist of the user, wherein the minimized version of the pending notification is positioned relative to an identified portion of the wrist; or
      identifying that a user gaze is directed to the minimized version of the pending notification for above a first threshold amount of time;
   in response to the first trigger event, displaying a maximized version of the pending notification;
   detecting a second trigger event,
      wherein, when the first trigger event comprises identifying the user gesture comprising the first rotation of the wrist, the second trigger event comprises identifying a second rotation of the wrist in a direction opposite from the first rotation of the wrist; and
      wherein, when the first trigger event comprises identifying that the user gaze is directed to the pending minimized version of the pending notification for above the first threshold amount of time, the second trigger event comprises identifying that the user gaze is not directed to the maximized version of the pending notification for above a second threshold amount of time; and
   in response to the second trigger event, stopping display of the maximized version of the pending notification.

2. The method of claim 1, wherein displaying the minimized version of the pending notification, the maximized version of the pending notification, or both comprises:
   identifying a type of the pending notification;
   accessing a mapping of notification types to display properties; and using one or more display properties mapped, in the mapping, to the identified type of the pending notification to display the minimized version of the pending notification, the maximized version of the pending notification, or both.

3. The method of claim 2, wherein the one or more display properties comprise one or more of:
one or more colors;
one or more fonts;
one or more patterns;
one or more border properties; or
any combination thereof.

4. The method of claim 2, wherein identifying the type of the pending notification is based on:
identifying a type indicator associated with the pending notification; or
a mapping of an identified notification context to notification types, wherein identifying the notification context comprises one or more of:
identifying an application or operating system that was a source of the pending notification;
identifying an organization that was the source of pending notification;
identifying a relationship between a current user and a user associated with the pending notification;
identifying a subject of the pending notification;
identifying a system resource to which the notification relates; or
any combination thereof.

5. The method of claim 1, wherein the minimized version of the pending notification includes an image or sequence of images without text and wherein the maximized version of the pending notification includes text.

6. The method of claim 1, wherein the first trigger event comprises identifying the user gesture comprising the first rotation of the wrist.

7. The method of claim 1, wherein the first trigger event comprises identifying that the user gaze is directed to the pending minimized version of the pending notification for above the first threshold amount of time.

8. A non-transitory computer-readable storage medium storing instructions that, when executed by a computing system, cause the computing system to perform operations for providing notifications in an artificial reality environment, the operations comprising:
receiving an indication of a pending notification;
displaying a minimized version of the pending notification in the artificial reality environment;
detecting a trigger event comprising one or more of:
identifying a user gesture, wherein the minimized version of the pending notification is positioned relative to a body part of the user that made the identified user gesture; or
identifying that a user gaze is directed at the minimized version of the pending notification for above a threshold amount of time; and
in response to the trigger event, displaying a maximized version of the pending notification;
wherein displaying the minimized version of the pending notification, the maximized version of the pending notification, or both comprises:
identifying a type of the pending notification;
accessing a mapping of notification types to display properties; and
using one or more display properties mapped, in the mapping, to the identified type of the pending notification to display the minimized version of the pending notification, the maximized version of the pending notification, or both.

9. The non-transitory computer-readable storage medium of claim 8, wherein the trigger event is a first trigger event, the user gesture is a first rotation of a wrist, the threshold amount of time is a first threshold amount of time, and the operations further comprise:
detecting a second trigger event,
wherein, when the first trigger event comprises identifying the user gesture comprising the first rotation of the wrist, the second trigger event comprises identifying a second rotation of the wrist; and
wherein, when the first trigger event comprises identifying that the user gaze is directed at the pending minimized version of the pending notification for above the first threshold amount of time, the second trigger event comprises identifying that the user gaze is not directed at the maximized version of the pending notification for above a second threshold amount of time; and
in response to the second trigger event, stopping display of the maximized version of the pending notification.

10. The non-transitory computer-readable storage medium of claim 8, wherein the one or more display properties comprise one or more of:
one or more colors;
one or more fonts;
a level of opacity; or
any combination thereof.

11. The non-transitory computer-readable storage medium of claim 8, wherein identifying the type of the pending notification is based on:
identifying a type indicator associated with the pending notification; or
a mapping of an identified notification context to notification types, wherein
identifying the notification context comprises one or more of:
identifying an application or operating system that was a source of the pending notification;
identifying a subject of the pending notification;
identifying a system resource to which the notification relates; or
any combination thereof.

12. The non-transitory computer-readable storage medium of claim 8, wherein the minimized version of the pending notification includes an image or sequence of images without text and wherein the maximized version of the pending notification includes text.

13. The non-transitory computer-readable storage medium of claim 8, wherein the trigger event comprises identifying the user gesture.

14. The non-transitory computer-readable storage medium of claim 8, wherein the trigger event comprises identifying that the user gaze is directed at the pending minimized version of the pending notification for above the threshold amount of time.

15. A computing system for providing notifications, the system comprising:
one or more processors; and
one or more memories storing instructions that, when executed by the one or more processors, cause the computing system to perform operations comprising:
receiving an indication of a pending notification;
displaying a minimized version of the pending notification;
detecting a first trigger event comprising one or more of:
identifying a user gesture comprising a first rotation of a wrist of the user, wherein the minimized version of the pending notification is positioned relative to an identified portion of the wrist; or identifying that a user gaze is pointed at the minimized version of the pending notification for above a first threshold amount of time;

in response to the first trigger event, displaying a maximized version of the pending notification;

detecting a second trigger event, wherein, when the first trigger event comprises identifying the user gesture comprising the first rotation of the wrist, the second trigger event comprises identifying a second rotation of the wrist in a direction opposite from the first rotation of the wrist; or wherein, when the first trigger event comprises identifying that the user gaze is directed to the pending minimized version of the pending notification for above the first threshold amount of time, the second trigger event comprises identifying that the user gaze is not directed to the maximized version of the pending notification for above a second threshold amount of time; and in response to the second trigger event, stopping display of the maximized version of the pending notification.

16. The computing system of claim 15, wherein displaying the minimized version of the pending notification comprises:

identifying a type of the pending notification;

accessing a mapping of notification types to display properties; and using one or more display properties mapped, in the mapping, to the identified type of the pending notification for minimized notifications, to display the minimized version of the pending notification.

17. The computing system of claim 16, wherein identifying the type of the pending notification is based on a mapping of an identified notification context to notification types, wherein identifying the notification context comprises one or more of:

identifying an application or operating system that was a source of the pending notification;

identifying an organization that was the source of pending notification;

identifying a relationship between a current user and a user associated with the pending notification;

identifying a subject of the pending notification;

identifying a system resource to which the notification relates; or any combination thereof.

* * * * *